United States Patent [19]

Holmes et al.

[11] Patent Number: 5,948,142
[45] Date of Patent: Sep. 7, 1999

[54] PRESSURE AND TEMPERATURE SWING ADSORPTION AND TEMPERATURE SWING ADSORPTION

[75] Inventors: Richard J Holmes; David C Francis, both of Salisbury, United Kingdom

[73] Assignee: The Secretary of State for Defense in Her Britannic Majesty's Government of the United Kingdom of Great Britain and Northern Ireland, United Kingdom

[21] Appl. No.: 08/817,974

[22] PCT Filed: Nov. 10, 1995

[86] PCT No.: PCT/GB95/02623

§ 371 Date: Apr. 28, 1997

§ 102(e) Date: Apr. 28, 1997

[87] PCT Pub. No.: WO96/14916

PCT Pub. Date: May 23, 1996

[30] Foreign Application Priority Data

Nov. 11, 1994 [GB] United Kingdom .................... 9422833

[51] Int. Cl.$^6$ ................................................. B01D 53/047
[52] U.S. Cl. ................................. 95/99; 95/105; 95/106; 95/120; 95/123; 95/143; 96/126; 96/130; 96/144
[58] Field of Search ................................ 95/99, 104–106, 95/114–120, 123–126, 141–148; 96/108, 126, 130, 132, 144, 146

[56] References Cited

U.S. PATENT DOCUMENTS

| | | | |
|---|---|---|---|
| 2,096,851 | 10/1937 | Fricke | 96/132 |
| 2,195,565 | 4/1940 | Fricke | 96/132 |
| 2,661,808 | 12/1953 | Kahle | 95/115 |
| 2,675,089 | 4/1954 | Kahle | 95/115 |
| 3,193,985 | 7/1965 | Siggelin | 55/33 |
| 3,853,516 | 12/1974 | Lyshkow | 96/132 X |
| 3,961,919 | 6/1976 | Lamoreaux | 55/184 |
| 4,451,435 | 5/1984 | Hölter et al. | 96/126 X |
| 4,544,384 | 10/1985 | Metschl et al. | 96/130 |
| 4,572,178 | 2/1986 | Takase et al. | 96/132 X |
| 4,801,313 | 1/1989 | Mann | 96/126 |
| 4,859,427 | 8/1989 | Konishi et al. | 96/126 X |
| 4,891,051 | 1/1990 | Frantz | 96/130 X |
| 5,169,413 | 12/1992 | Leavitt | 96/130 X |
| 5,181,942 | 1/1993 | Jain | 96/126 X |
| 5,198,001 | 3/1993 | Knebel et al. | 95/126 X |
| 5,202,096 | 4/1993 | Jain | 96/126 X |
| 5,221,520 | 6/1993 | Cornwell | 95/117 X |
| 5,451,248 | 9/1995 | Sadkowski et al. | 96/132 X |
| 5,674,311 | 10/1997 | Notaro et al. | 96/132 X |

FOREIGN PATENT DOCUMENTS

| | | | |
|---|---|---|---|
| 2683157 | 5/1993 | France | 96/126 |
| 1619855 | 8/1970 | Germany | 96/126 |
| 62-183838 | 8/1987 | Japan | 96/132 |
| 5-000222 | 1/1993 | Japan | 96/126 |

Primary Examiner—Robert Spitzer
Attorney, Agent, or Firm—Nixon & Vanderhye

[57] ABSTRACT

A method is provided for separating one or more volatile contaminant components from a gas using a pressure and temperature swing adsorbent filtration filter bed system containing three or more layers of adsorbent materials characterized in that the layers comprise a first layer of adsorbent material, a second layer of dessicant material and a third layer of material capable of adsorbing contaminants that are not retained by the first layer. Preferably the third layer is capable of adsorbing contaminants of relatively low boiling point, e.g. of boiling point less than 50° C., and preferably comprises a microporous adsorbent. The second layer of dessicant material preferably comprises a zeolite.

23 Claims, 8 Drawing Sheets

PRESSURE AND TEMPERATURE SWING ADSORPTION AND TEMPERATURE SWING ADSORPTION

BACKGROUND OF THE INVENTION

The present invention relates to methods of treating gases using pressure and temperature swing adsorption, or temperature swing adsorption, together with apparatus and materials for use therein. Particularly the method is directed at purification of gases by removal of particular components therefrom, and the regeneration of adsorbent materials in the apparatus used for the method.

The requirements of an adsorbent system for cyclic filtration processes are not comparable with those of conventional single pass filters. This is because the metallic impregnants on such filters are an undesirable feature as they promote chemisorption. For maximum performance and service life cyclic filtration must therefore proceed reversibly by physical adsorption. Furthermore, the regeneration step must not result in adsorbent degradation; thermal aging, which can result from overheating of the filter bed, being just one example of such adsorbent degradation. In addition to these considerations, other factors such as particle size and hardness must be assessed when selecting adsorbents for PTSA applications.

Air purification processes. such as those required in collective protection situations wherein air from an external source is purified before delivery to an enclosed area occupied by personnel, typically consist of three stages each requiring a different adsorbent material; (i) removal of high boiling contaminants (e.g. boiling point over 50° C.), (ii) removal of water vapour, and (iii) removal of low boiling contaminants (e.g. boiling point below 50° C.). The distinction between high and low boiling contaminants in terms of exact temperature range is not important; the critical requirement is the removal of contaminants having a boiling point between approximately −90° C. and 200° C.).

The identification of an adsorbent for cyclic filtration of high boiling components is especially demanding as such components are generally strongly physically adsorbed and may be irreversibly retained. Adsorbent characterisation using nitrogen adsorption will elucidate the porous characteristics of an adsorbent but are not useful in prediction of adsorption and regeneration properties; adsorption and desorption data for dimethylmethylphosphonate, ethandiol and a range of other high boiling simulants provides more useful data in this regard.

Using such volatile materials the present inventors have studied a variety of adsorbents and determined that, although many of these have high adsorption capacity, in order for a filter bed to be adequately regenerable only certain types of adsorbent materials meet operational requirements.

DETAILED DESCRIPTION OF THE INVENTION

Thus in a first aspect of the present invention there is provided a method for separating one or more volatile contaminants from a subject gas using a temperature, or pressure and temperature, swing adsorbent filtration filter bed apparatus comprising three or more layers of adsorbent materials, characterised in that the layers comprise a first layer of material capable of adsorbing material of relatively high boiling point, a second layer of desiccant material and a third layer of material capable of adsorbing material not adsorbed by the first layer and in that each of the layers may be purged of adsorbed contaminants by a gas having a higher temperature than that from which the contaminants were adsorbed, or having a combination of higher temperature and lower pressure than that from which the contaminants were adsorbed, and the method comprising passing the subject gas through the filters serially in the order first layer, second layer, then third layer.

Although these three are the only layers illustrated in the following examples, the claims should be construed as including the cases where other layers are present, adjacent or between the first, second and third layers described herein.

In a preferred embodiment the layers comprise a first layer of mesoporous adsorbent material a second layer of desiccant material and a third layer of material capable of adsorbing contaminants that are not retained by mesoporous material.

Preferably the mesoporous layer is an activated carbon and the third layer is capable of adsorbing contaminants of relatively low boiling point, e.g. of boiling point less than 50° C.; most suitably being a microporous adsorbent. Most preferably the method is arranged to be particularly suitable for the removal of contaminants from an oxygen and/or nitrogen containing gas such as air.

The order of the layers is essential as high boiling point contaminants have been found by the inventors to be retained on all non-mesoporous adsorbents they have tested at high levels, even at temperatures of up to 450° C. Thus by the inclusion of a mesoporous adsorbent upstream of the desiccant these downstream layers are protected from the high boiling point contaminants retained on the mesoporous layer.

The efficiency of filtration of high boiling point compounds is not affected significantly by water vapour due to the higher enthalpies of condensation compared with water, whereas the third layer, ideally a molecular sieve such as a zeolite and/or a microporous carbon, and/or mesoporous carbon, will have its efficiency reduced by water vapour. By the inclusion of a desiccant layer upstream of the third layer the latter can be protected from water vapour in the gas which is known to have a deleterious effect on adsorption of many agents by adsorbents such as activated carbons (see C R Hall and R J Holmes (1989) Ads Sci and Technol., 6 83: and ISRP Journal; 6, Summer 1992).

The mesoporous layer may be any of the well known mesoporous materials obtainable from suppliers such as Westvaco, Norit, Chemviron, Elf Atochem, UOP, Grace, Down and Rohm & Haas; typical of those suitable are SA1817, Durferrit, CAR and BAX. The most preferred material of those so far investigated is BAX as it regenerates efficiently and possesses the most appropriate physical properties; i.e. relatively large particle size and resistance to oxidation and attrition.

The third layer may employ any of the well known microporous adsorbents such as RB1, NC35, Zeolites (e.g. 13X) or may be mesoporous carbon. The desiccant layer will preferably be selected from those known to be efficacious in existing pressure swing adsorber drier units e.g. zeolites 13X and 3A.

The arrangement of the layers in the bed should be such that they can each be heated for the purposes of regene-ation in the temperature swing adsorption (TSA) or pressure temperature swing adsorption (PTSA) fashion. Such arrangement might conveniently be provided in any fashion that allows controlled heating of the bed layer, and is most conveniently realized in use of a bed apparatus as described in patent application UK 9422835.0.

UK patent application 9422835.0 describes in a first aspect a method of heating a pressure and temperature swing adsorption gas filtration bed unit, or temperature swing adsorption gas filtration bed unit, the method comprising locating a heating means within the bed housing and characterised in that the heating means acts to heat gas passing into the bed or a layer thereof in the purge direction and uses the heated air to heat the adsorbent material.

In a preferred embodiment of this aspect of UKPA 9422835.0 the method employs a number of layers of adsorbent material within the filtration bed housing and positions a heating means upstream, with respect to the purge flow direction, of each of these layers. Most preferably the heating means are used to separate the multilayer bed units that are the subject matter of the present invention.

In this manner the temperature selected for regeneration of a particular adsorbent material may be matched more closely to its particular characteristics, especially with regard to its thermal degradation characteristics and the amount of heat required to purge a particular component from a particular layer at a given pressure.

Particularly preferred heaters for the purpose of heating the gas as it enters each layer of a bed are provided in the form of disc shaped heater units located within divider elements which may be used for supporting and in turn being supported by the adsorbent of an adjacent adsorbent material layers. Suitable such heater units are Curie point heaters such as those provided by Domnick Hunter Filters UK, (these being conveniently located in batteries of three heater elements each) or any other arrangement including batteries containing six or more such discs, or elements of different shape.

The heaters are controlled, in the preferred arrangement, using a microprocessor device (there being no need to monitor bed temperature). The microprocessor device allows rapid control of the bed heaters including the provision of sequential shutdown in order to minimise cooling periods required and thus return the bed to operational condition as soon as possible. The electrical connections to the heater batteries and sensors may conveniently be provided entering through the ends of the bed, as will be seen in the Example below.

The particular use of batteries of air heaters placed within transverse elements to divide a bed into layers allows placement of heaters at any desired position within the bed. The preferred Curie point heaters are of honeycomb construction and provide direct gas heating during passage of gas through the bed with gas temperature controlled by the composition of the heater element.

The requirements for pure or cleaned air in other applications can also be fulfilled by the present invention. Other applications may require two adsorbent layers or more than three adsorbent layers. The present invention will also result in improvements in adsorbent life and performance in, for example, air drying applications.

In a particular embodiment, the method of the invention is used to provide a collective protection environment for personnel aboard a military or civilian aircraft. Compressed air, heating and cooling means are already available in such an environment.

The method, apparatus and adsorbents of the invention will now be described further by way of illustration only by reference to the following non-limiting examples and figures. Further embodiments falling within the scope of the claims will occur to those skilled in the art in the light of these.

BRIEF DESCRIPTION OF THE DRAWINGS

FIG. 8b is an elevation view of the heater of FIG. 8a.

MATERIALS AND METHODS

Activated carbons, zeolite and polymer based adsorbents were obtained from Westvaco, Norit, Chemviron, Elf Atochem, UOP, Grace, Dow and Rohm & Haas. Nitrogen adsorption for characterising the pore structure was carried out by the method of K S W Sing (1970) 'Surface Area Determination', Edit. Everett and Ottewill, Butterworths, London; pp 25–42. Characterisation of physical properties of the adsorbents also included particle size analysis, packing density and voidage measurements. The ability of the adsorbents to resist attrition during repeated pressure swing cycling was assessed initially using a small packed bed arrangement employing rapid 7 to 0 bar pressure swings (approx 5000 cycles).

Assessment of adsorption and desorption properties was carried out after first outgassing samples at 120° C., 3 mbar. The adsorption of water vapour and high boiling components, including dimethylmethylphosphonate (DMMP, simulant for G agents), and 1,2-ethandiol and 2-chlorethylether (boiling point and structural simulant for H agents) was carried out by exposing samples to each vapour in a desiccator at 30° C.

Desorption was measured using thermal gravimetric analysis (TG); a 25 $cm^3$ $min^{-1}$ airflow was passed through the TG furnace containing the sample during desorption which was then carried out using a 20° C. min$^{-1}$ ramp to 180° C. and the sample maintained at that temperature for 75 minutes prior to cooling; in some cases desorption being repeated more than once without re-equilibration, to determine the efficiency of post-challenge regeneration (cycle experiments). 180° C. was selected as the regeneration temperature to minimise any risk of adsorbent decomposition or thermal aging. Adsorption and desorption of low boiling point components including HFC134a was carried out using a semiautomatic microbalance IGA system (Hiden Analytical Ltd UK).

Chemical warfare (CW) agent simulants were selected to reflect both structure and boiling point where possible. Breakthrough data was obtained using a semiautomatic pressure and temperature swing apparatus (Hiden Analytical Ltd, UK).

Adsorbent for First Layer

High Boiling Point Material Adsorbent

Figure 1:
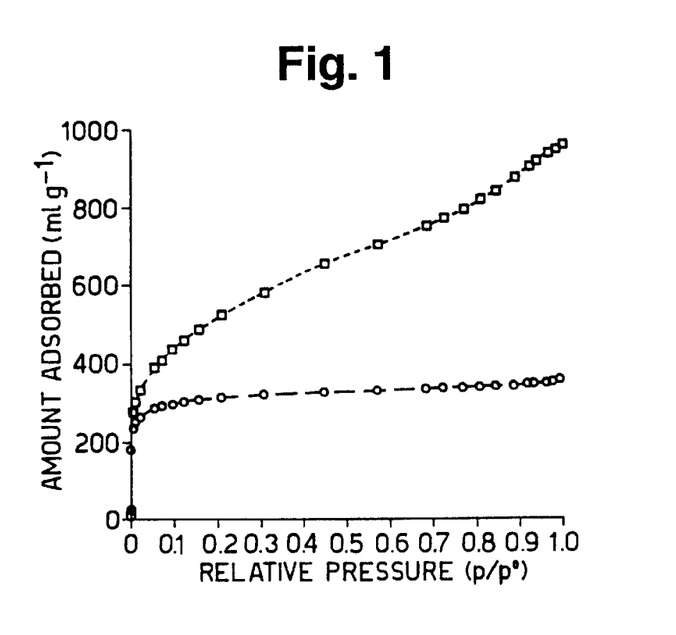
FIG. 1 is a graph of amount of nitrogen adsorbed mg $g^{-1}$ v relative pressure ($p/p°$) to show the mesoporous character for carbons WVA1100 and RB1.

Examples of nitrogen isotherms are shown in FIG. 1, while Table 1 shows surface area, pore volume data, particle size and oxidation temperature (° C.); meso and macro porosity being preferred pore volume characteristics.

TABLE 1

| Adsorbent | Surface Area m g | Pore Vol cm$^3$ g$^{-1}$ | Micropore cm$^3$ g$^{-1}$ | Mesopore cm$^3$ g$^{-1}$ | Particle(mm) length | Particle(mm) width | Oxidation Temp |
|---|---|---|---|---|---|---|---|
| RB1 | 1084 | 0.485 | 0.417 | 0.068 | 2.3 | 1.1 | 380–400 |
| NC35 | 1347 | 0.584 | 0.528 | 0.056 | 5.7 | 4.0 | 240–255 |
| CAR95 | 1414 | 0.795 | 0.489 | 0.306 | 3.7 | 2.4 | 270–400 |
| BAX950 | 1250 | 0.810 | 0.392 | 0.418 | 4.0 | 2.0 | 330–410 |
| Zeolite 13X | 606 | 0.302 | 0.225 | 0.077 | 2.4 | 4.8 | * |
| Amberlite | | 0.875 | 0.13 | 0.745 | 0.4 | | 280–310 |

* = temperature stable; RB1 and NC35 are microporous carbons, CAR95 and BAX950 are mesoporous carbons, Zeolite 13X is microporous, XAD4 is a polymer.

Figure 2:
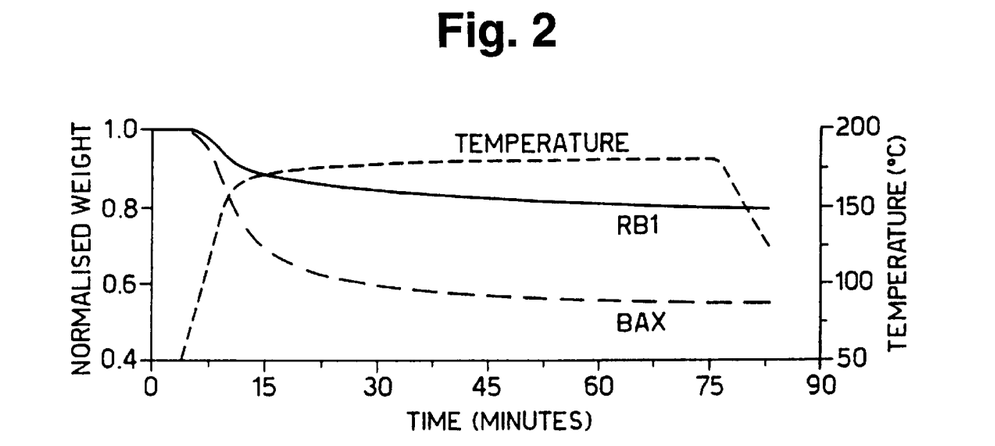
FIG. 2 is a graph of thermal desorption of DMMP from BAX and RB1 carbons with changing temperature.

Adsorption data for DMMP and the ethandiol are shown in Table 2 and Table 3 with typical desorption profiles being shown in FIG. 2. All the materials tested proved to have high adsorption capacity, but predominantly mesoporous materials have significantly greater capacity.

Figure 3:
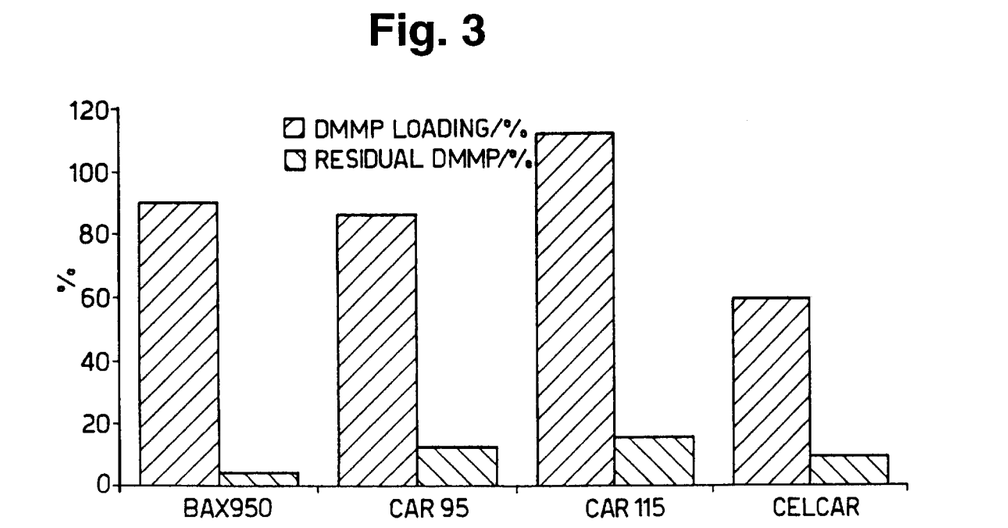
FIG. 3 is a histogram showing the adsorption and desorption of DMMP from mesoporous carbons.
Figure 4:
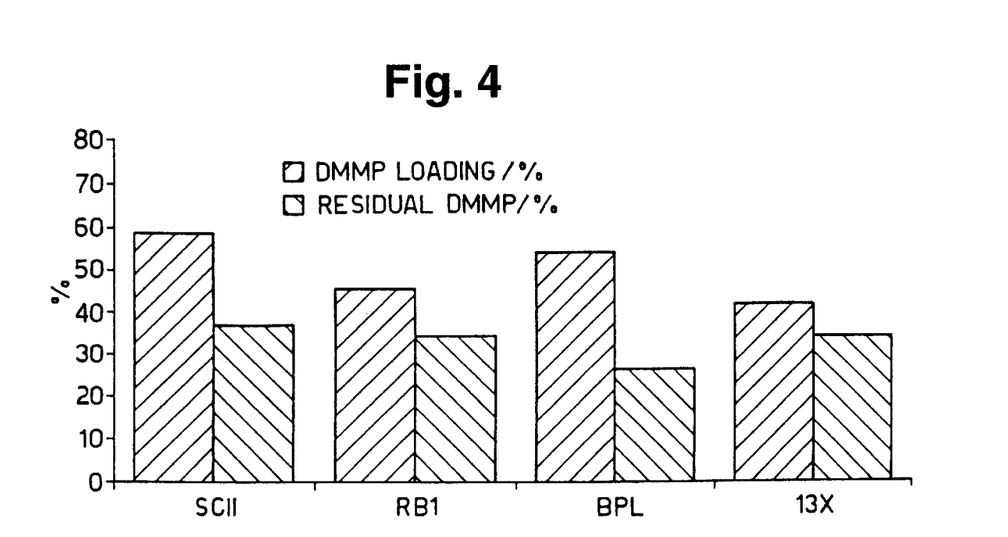
FIG. 4 is a histogram showing adsorption and desorption of DMMP from microporous adsorbents.

The microporous adsorbents, including 13X zeolite, do not regenerate adequately, retaining more than 30% of the initial adsorbate load; 13X retaining 10% of the adsorbate load at temperatures of above 4500C. This contrasts with the mesoporous adsorbents which retain less than 10%. The behaviour of the different adsorbent types is quite general (see FIGS. 3 and 4 where loading and residual are the amounts adsorbed and retained respectively as weight percent of DMMP, at the beginning and end of a single desorption experiment).

The effect of pressure swing alone was shown to have little effect on desorption, illustrating the need for a thermal swing.

TABLE 2

Adsorption and desorption of DMMP

| Adsorbent | Amount Adsorbed wt/wt % | 180° C. Isothermal Region Loss 30 min | 60 min | 75 min | Residual % |
|---|---|---|---|---|---|
| RB1 | 45.6 | 50.4 | 61.3 | 64.5 | 34.2 |
| NC35 | 43.8 | 41.3 | 51.4 | 54.8 | 43.8 |
| CAR95 | 85.5 | 75.3 | 85.3 | 87.2 | 12.5 |
| BAX950 | 91.3 | 84.6 | 90.5 | 91.4 | 4.3 |
| Zeolite 13X | 46.3 | 65.3 | 67.8 | 68.4 | 34.3 |
| Amberlite XAD4 | 115.1 | 97.3 | 99.4 | 99.5 | 0.04 |

Amount adsorbed is w/w %. Residual loss, determined as % of adsorbent remaining after cooling; original adsorbate loading is 100%.

A comparison of the data in Table 2 with that of Table 3 below, illustrates a strong time dependency of the degree of desorption, indicating that the duration of the heat regeneration phase, including the cooling stage, will be a primary factor in controlling the size and number of beds used. It is notable that a number of the mesoporous materials generated with relatively high efficiency.

Since the TG experiments do not enable airflow through the sample, cycle experiments were carried out to determine the efficiency of post-challenge regeneration. For BAX carbon the residual DMMP loading was ca. 1% (99% desorption after 5 cycles): for Zeolite 13X the residual value was 35% (5 cycles, no further loss detected after the third cycle). These results illustrate that commercially available mesoporous adsorbents exist which possess appropriate adsorption and regeneration characteristics.

TABLE 3

Adsorption and Desorption of Ethandiol

| Adsorbent | Amount Adsorbed wt/wt % | 180° C. Isothermal Region Loss 30 min | 60 min | 75 min | Residual % |
|---|---|---|---|---|---|
| RB1 | 42.9 | 59.4 | 78.4 | 82.1 | 16.6 |
| NC35 | 41.8 | 65.6 | 85.5 | 90.1 | 8.5 |
| CAR95 | 86.5 | 79.2 | 90.0 | 90.9 | 5.4 |
| BAX950 | 63.7 | 85.9 | 94.9 | 95.2 | 2.2 |

TABLE 3-continued

Adsorption and Desorption of Ethandiol

| Adsorbent | Amount Adsorbed wt/wt % | 180° C. Isothermal Region Loss | | | Residual % |
| --- | --- | --- | --- | --- | --- |
| | | 30 min | 60 min | 75 min | |
| Zeolite 13X | 27.0 | 37.6 | 40.9 | 41.7 | 54.9 |
| Amberlite XAD4 | 45.2 | 99.4 | −0.3 | −0.3 | −10.8 |

Negative mass change may represent adsorbent decomposition.

A comparison of BAX with microporous carbon data for nitrogen adsorption indicates that this mesoporous carbon possesses a comparable micropore volume (see Table 1); the difference in regeneration properties possibly reflecting the well developed mesopore structure which probably results in more efficient and rapid transport of the organic chemicals from the micropore structure.

Figure 5:
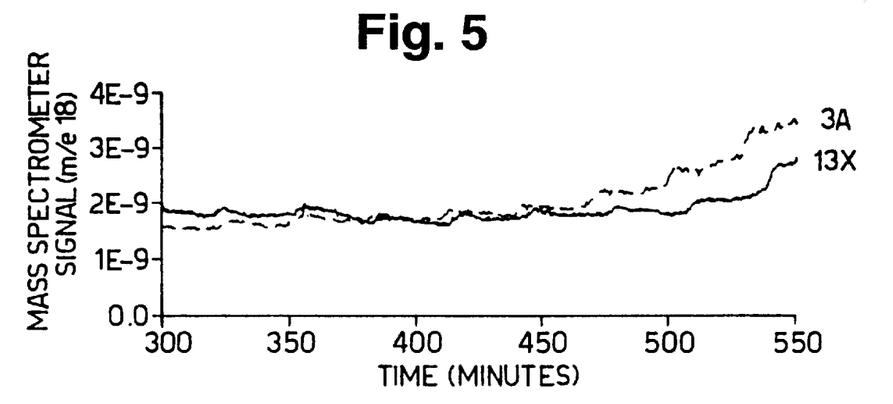
FIG. 5 is a graph of water vapour breakthrough measured at 8 bar, 5 $dm^3 min^{-1}$ at 25° C. for 13X and 3A molecular sieve adsorbents.

Tables 2 and 3 show that the performance of molecular sieve for water separation purposes in the desiccant layer(s) will be reduced due to fouling if exposed to high boiling compounds; hence illustrating the need for the upstream location of the mesoporous layer. Typical breakthrough measurements for water vapour through desiccant beds are shown in FIG. 5 wherein beds were challenged with a saturated airflow.

As low boiling compounds are only poorly adsorbed under humid conditions, penetration of such contaminants through the mesoporous layer, and at least part of the desiccant bed, will proceed rapidly.

Figure 6:
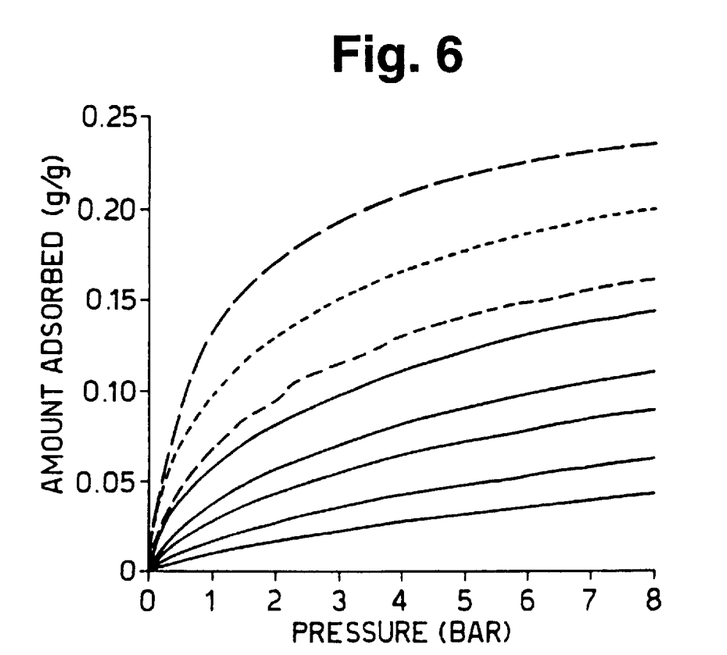
FIG. 6 shows adsorption isotherms of HFC134a; on Norbit RB1 at 25° C., 40° C., 55° C., 70° C., 85° C., 100° C., 125° C. and 150° C. (upper to lower traces).

FIG. 6 shows characterisation of the microporous adsorbents with adsorption isotherms, showing the regeneration conditions for removal of HFC134a. Similar such measurements using zeolites and mesoporous carbons demonstrate the utility of these materials for separating light gases in the absence of water vapour.

Figure 7:
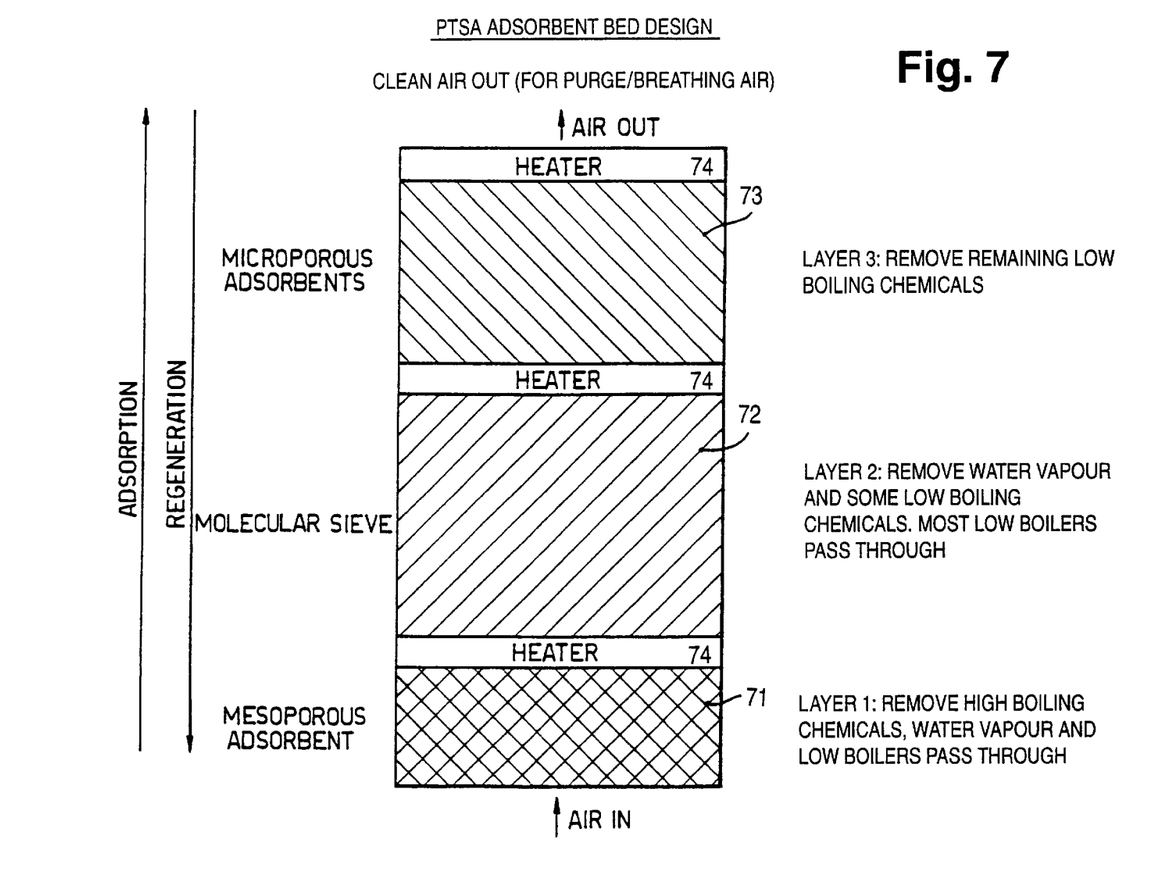
FIG. 7 shows a schematic representation of a filter bed arrangement which might typically be used by the current invention.

Referring to FIG. 7, a typical PTSA adsorbent filter bed of the current invention comprises a first layer 71 of mesoporous adsorbent, a second layer 72 of molecular sieve and a third layer 73 of microporous adsorbent. A heater 74 is disposed between each filter bed layer. During normal operation, gas to be purified passes through layer 71 first where high boiling chemicals are removed. The gas then passes through layer 72 where water vapour and some chemicals of lower boiling point than those trapped in layer 71 are removed. Finally, the gas passes through layer 73 where chemicals of a low boiling point relative to those trapped by layer 71 are removed.

Figure 8A:
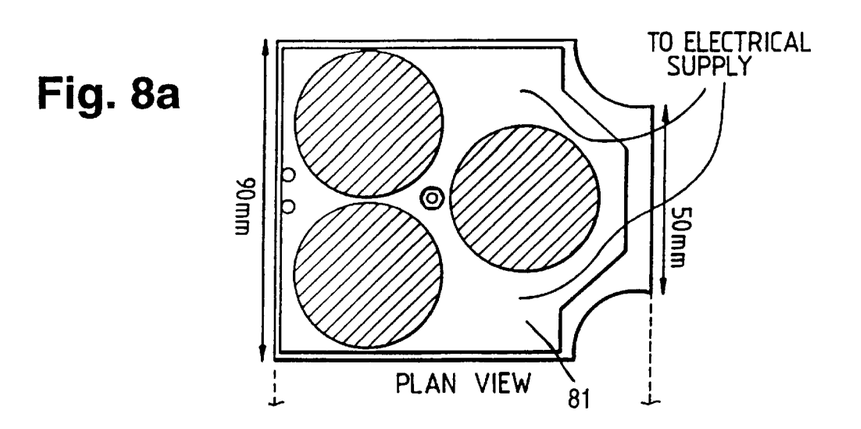
FIG. 8a shows a plan view of three element Curie point heater showing its dimensions.
Figure 8B:
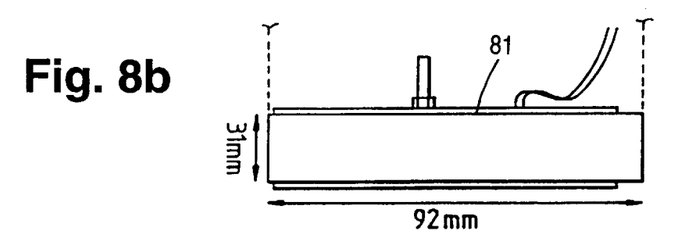
Figure 8C:
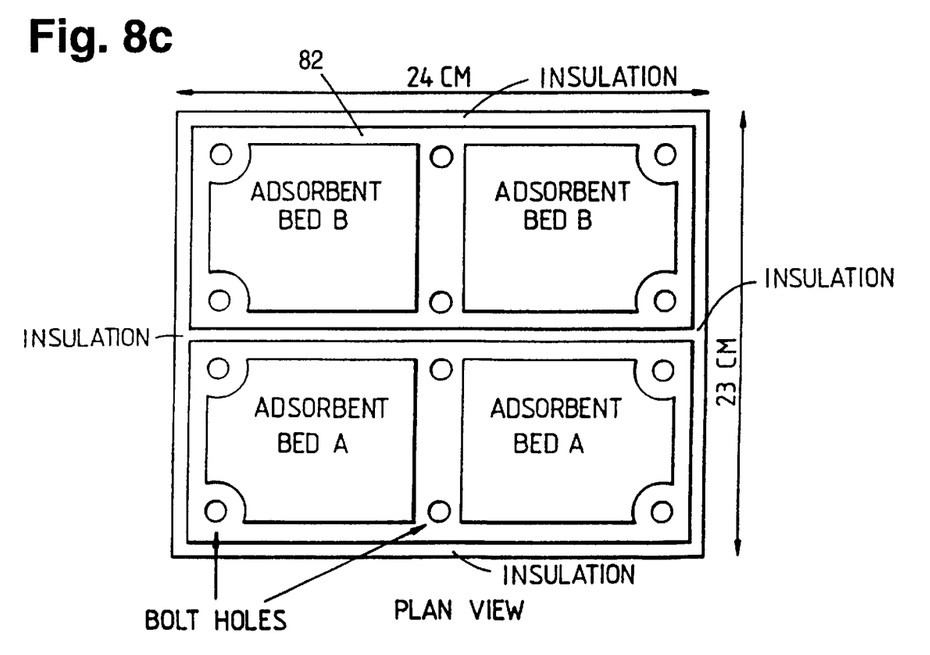
FIG. 8c shows a divider element in which the heater of FIG. 8a and 8b is placed during operation.
Figure 9:
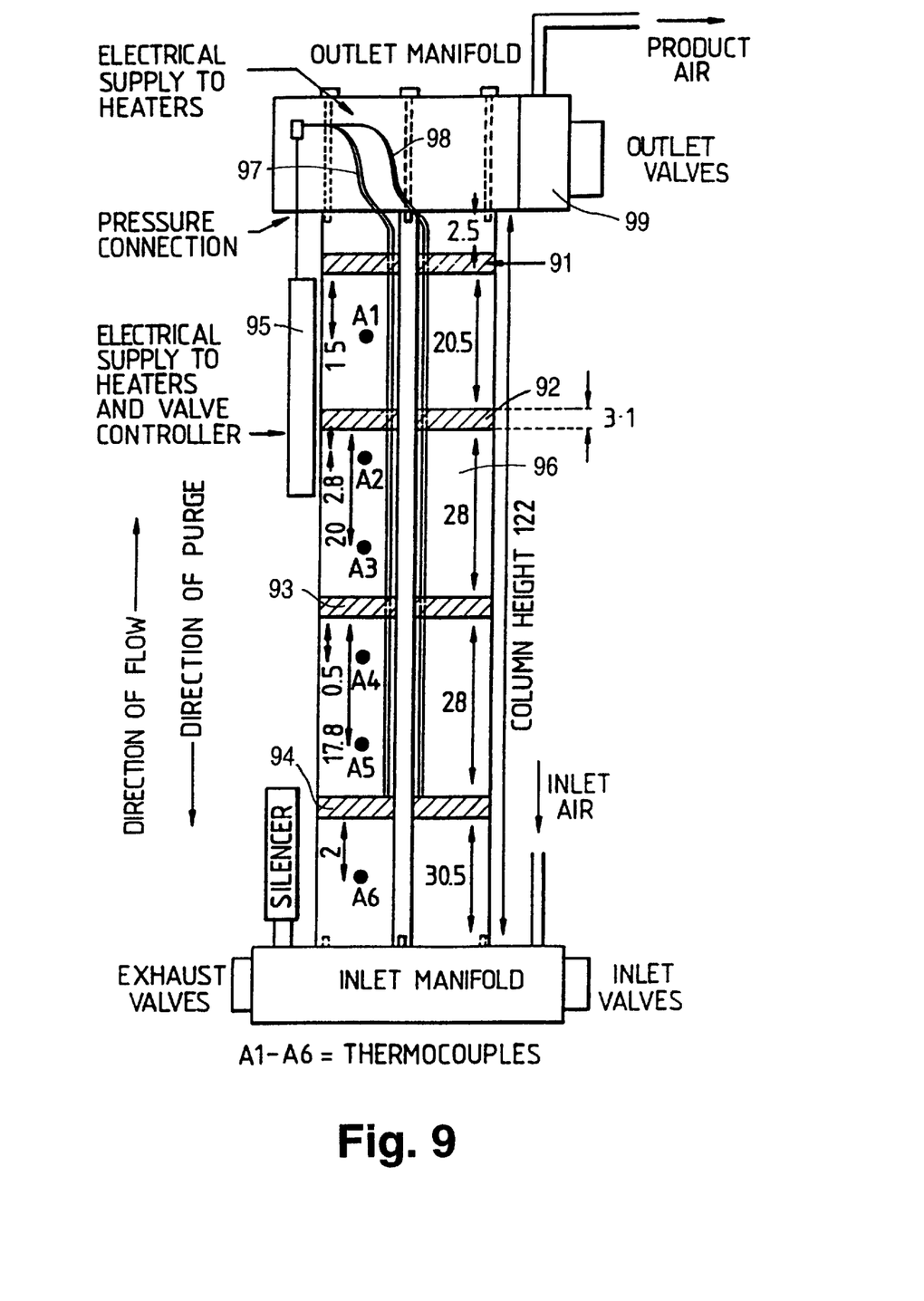
FIG. 9 shows the arrangement of four heater units of FIG. 8 within a vertically oriented bed such as to divide it into four layers.
Figure 10:
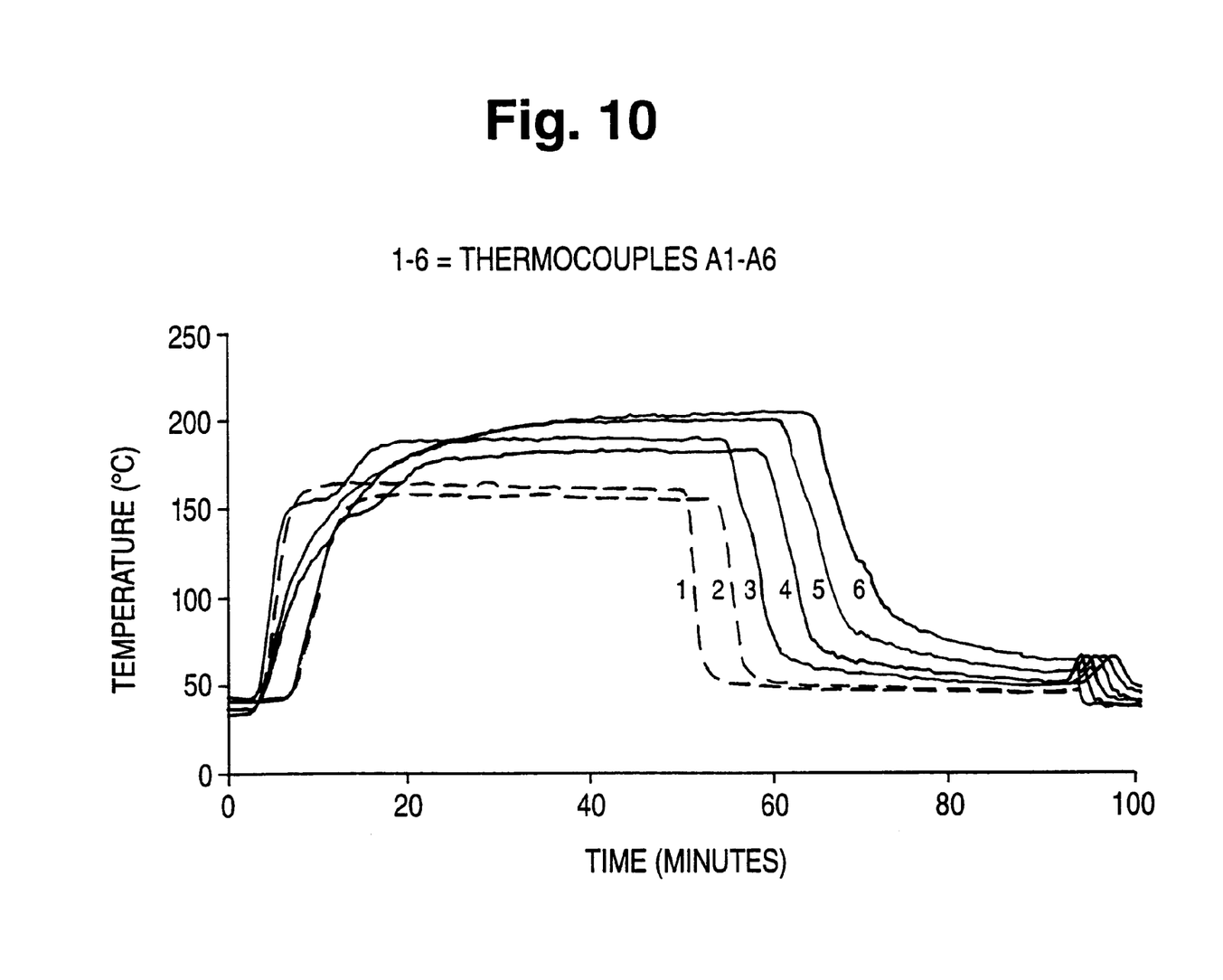
FIG. 10 shows temperature profiles obtained within a bed of zeolite using a 38.5 $dm^3$ fill at airflow rate 3120 $dm^3$ $min^{-1}$ at the thermocouples A1 to A6 of FIG. 9.

FIGS. 8a and 8b illustrate the use of Curie point heaters 81, 82 (three elements per battery) in a PTSA unit. These and the housings therefor were supplied by Domnick Hunter Filters Ltd, UK. Referring to FIG. 9, four batteries 91–94, each independently controlled via a microprocessor keypad timing device 95, were located axially within a 38.5 dm³ bed of zeolite 96, electrical connection being made by thin (2 mm) insulated wires 97, 98 which pass along the adsorber bed to connectors entering an upper manifold 99 via gas tight ducts. The upper manifold 99 and the lower manifold 100, which form an integral part of the bed housing, also contain the valving arrangement. Each heater element 91–94 is of honeycomb construction and provides direct air heating during passage of gas along the column of the bed unit. Gas temperature is controlled by the composition of the heating element at approximately 180–210° C. Power consumption is approximately 2 kW (eight three element blocks occupying 10% of the housing volume). Typical in-bed temperature profiles during heating and cooling measured using thermocouples shown at positions A1 to A6 are shown in FIG. 10 with a gas flow of air at 3120 dm³ min⁻¹. In obtaining these the heater batteries 91–94 were switched off sequentially. During regeneration of the filter bed 96, gas passes through the filter bed 96 in the opposite direction to that of the subject gas being filtered and is heated by the heaters 94–94. Each layer has an adjacent heater downstream thereof with respect to the direction of gas flow in filtration mode.

Figure 11:
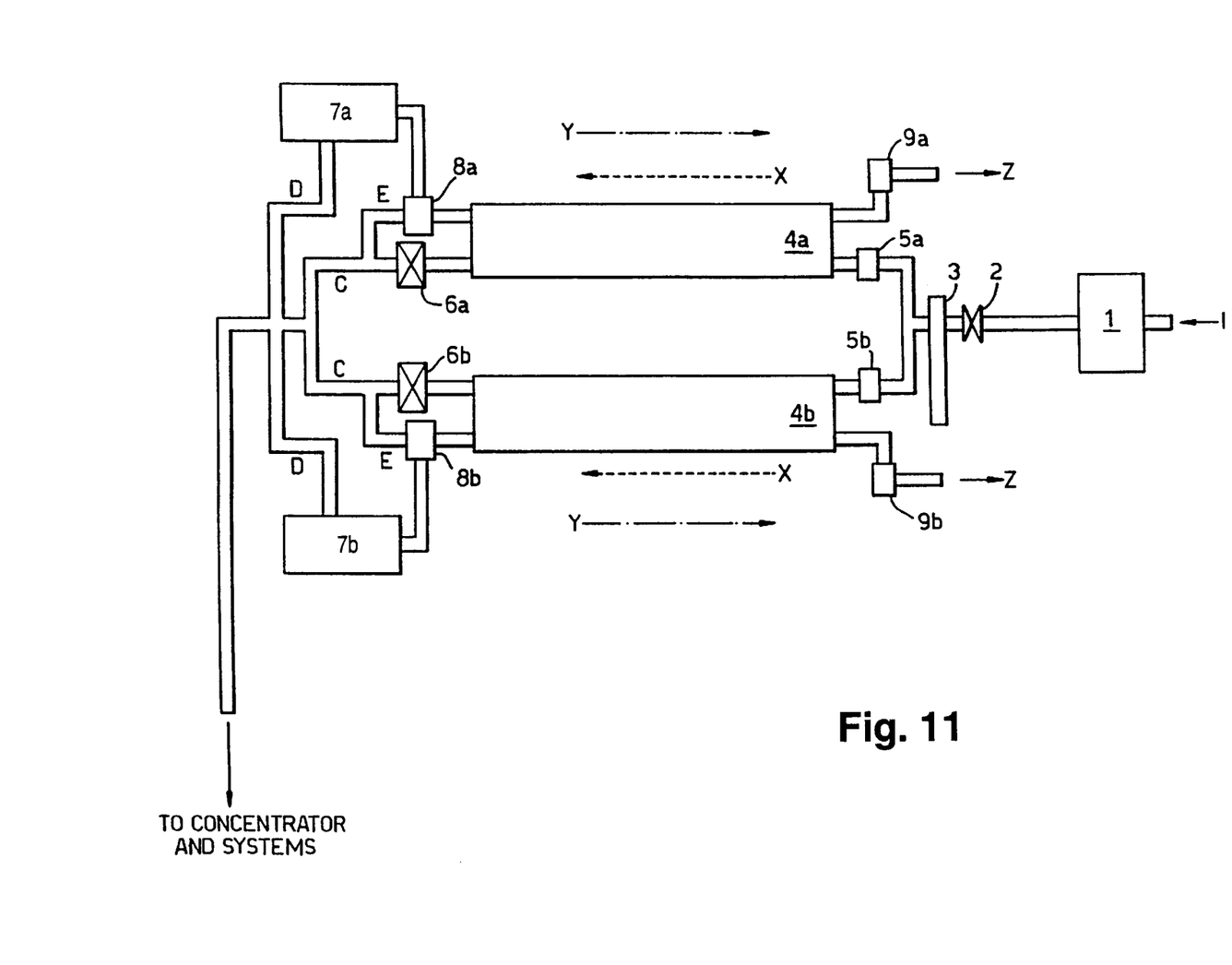
FIG. 11 shows a schematic representation of a system utilising the current invention to provide a collective protection environment for aircraft personnel.

Referring to FIG. 11, which illustrates use of the invention in an aircraft, inlet air I is fed to heat exchange 1 which provides primary cooling to reduce the air temperature to not greater than 50° C. and preferably below 40° C. The inlet air I may be derived from the aircraft auxiliary power unit, engine bleed or from ram air and should be not less than 4 bar, preferably about 7–8 bar. Total air demand is regulated by venturi 2. Entrained water and any liquid contamination is removed during passage of the air through coalescer 3. The coalescer is sited close to the inlet to the adsorber beds 4a, 4b and the liquid condensate is dumped overboard.

The airflow then passes onto adsorber bed 4a, via valve 5a. The product flow, after passing through non-return valve 6a passes into a manifold arrangement. The bulk of the air (perhaps 90%) then passes into the environmental control system supply for the purposes of systems air, and air for the oxygen concentrator (not shown). The remaining air passes through heat exchanger 76 which raises its temperature to about 200° C. prior to passage through valve 8b (two way. selectable) and onto adsorber bed 4b. The inlet air temperature to the regenerating bed should be at, or about, 200° C.

The regenerating air and the contaminants desorbed by it, (all of which flows in the opposite direction to air being filtered) then pass through a further valve 9b as an exhaust flow Z which would preferably be dumped overboard. The flow rate of regenerative air is regulated by a fixed constriction in the inlet pipe downstream of valve 8b. This allows the pressure to fall to about 1 bar during the heating stage.

On completion of the heating stage, bed 4b can be allowed to cool either by natural convention (termination of the regenerative airflow) or by switching the beds and allowing the input air I to flow onto the bed. Then the flow is via valve 6b to the concentrator with a proportion passing via heat exchanger 7a and valve 8a to regenerate bed 4a. Preferably a cool air purge E is applied via valve 8b prior to switching the beds over.

The siting of a flow restrictor downstream of valve 8b also serves to regulate the cooling flow since the manifold feed pressure will be the same for flow rates D and E (this arrangement means that flow rates D and E are the same). On completion or regeneration (and cooling) of bed 4b it becomes the adsorbing bed and bed 4a becomes the regenerating bed.

Although only two adsorbing beds are shown, the use of more than two beds is feasible and this may allow the design of a relatively compact system.

Heat exchanger 7 is shown as two separate units for clarity. In practice, the regenerative airflow would be obtained from a single heat exchanger from an appropriate design of the pipework. The system functions on a fixed cycle time and the valves may be controlled by a cam arrangement or, more preferably, by software.

The filtration system may be sited anywhere within the confines of the airframe to simplify integration, as long as the inlet temperature requirements are met. The system lends itself to incorporation on an aircraft since compressed air and means for heating and cooling are already available.

Use of a filter bed comprising the layered adsorbents as disclosed in the present application allows maximum protection to be achieved using a minimally sized apparatus due to increased capability for efficient regeneration and taking advantage of the temperature and pressure swing facility. This is equally applicable to the temperature swing process, but in this case the beds will need to be larger, owing to the need to remove larger quantities of water vapour which would normally be removed as a result of air compression during the PTSA process.

U.S. Pat. No. 3,961,919 discloses filtration apparatus incorporating three adsorbent layers, of which a first is adapted for the removal of oil vapour, a second comprises a desiccant, whilst the third may comprise activated carbon. The apparatus is neither a TSA nor a PTSA unit.

We claim:

1. A method for separating one or more volatile contaminants from a subject gas by passing the gas through a temperature swing adsorption filtration apparatus, the apparatus having a filter bed comprising at least three layers of adsorption material filters of which a first layer comprises a material capable of adsorbing contaminants of relatively high boiling point, the second layer comprises a desiccant and the third layer comprises a material capable of adsorbing contaminants not retained by the first layer, all the filter layers being adapted to be purged of adsorbed contaminants by passage therethrough of a purge gas at higher temperature than that of the gas whence contaminants are being separated, said method comprising alternately passing the subject gas through the filters serially in the order first layer, second layer then third layer and then passing a heated purge gas through the filters in the order third layer, second layer, then first layer.

2. A method as claimed in claim 1 wherein the purge gas is at lower pressure and high temperature than the subject gas.

3. A method as claimed in claim 1 wherein the apparatus comprises a plurality of said filter beds and said subject gas is passed through one said filter bed while another is being purged.

4. A method as claimed in claim 3 wherein the purging of any one of said filter beds is accomplished using a proportion of said subject gas which has been cleaned in another of said filter beds.

5. A method as claimed in claim 1 wherein said purge gas is heated by heaters located adjacent said filter layers.

6. A method as claimed in claim 5 wherein the heaters heat the purge gas to approximately 180 to 210° C.

7. A method as claimed in claim 5 wherein the heaters are closed down sequentially towards the end of when passage of the purge gas occurs.

8. A method as claimed in claim 1 wherein the subject gas is air.

9. Temperature swing adsorption apparatus for removing volatile contaminants from a subject gas having means for pumping purge gas therethrough and a filter bed comprising a plurality of filter layers in serial array including a first layer for removing relatively high boiling point contaminants, a second layer comprising a desiccant and a third layer comprising a relatively low boiling point contaminant adsorbent material, the purge gas pumping means passing the purge gas in the sequential direction third layer, second layer, then first layer.

10. Apparatus as claimed in claim 9 which is also a pressure swing adsorption apparatus.

11. Apparatus as claimed in claim 9 wherein the first layer comprises a mesoporous adsorbent material.

12. Apparatus as claimed in claim 11 wherein said mesoporous adsorbent material comprises an activated carbon.

13. Apparatus as claimed in claim 9 wherein said third layer comprises a microporous adsorbent material.

14. Apparatus as claimed in claim 9 wherein said third layer is a molecular sieve comprising at least one member selected from the group consisting of zeolite, microporous carbon and mesoporous carbon.

15. Apparatus as claimed in claim 9 including heater means operative to heat the purge gas.

16. Apparatus as claimed in claim 15 wherein said heater means comprises at least one Curie point heater.

17. Apparatus as claimed in claim 15 wherein said heater means are of honeycomb construction.

18. Apparatus as claimed in claim 9 having a heater associated with said filter layers.

19. Apparatus as claimed in claim 14 incorporating a heater control device operable for individual control of said heaters.

20. Apparatus as claimed in claim 19 wherein said heater control device is operable to close said heaters down sequentially.

21. Apparatus as claimed in claim 9 comprising a plurality of said filter beds.

22. Apparatus as claimed in claim 21 having means for shuttling said subject gas from one of said filter beds to another whereby while said subject gas is passing through one of said beds, another of said beds is being purged and a substantially continuous flow of cleaned subject gas ensues.

23. Apparatus as claimed in claim 22 including means for employing a proportion of the cleaned subject gas from any one bed in the purging of another of said beds.

* * * * *